UNITED STATES PATENT OFFICE.

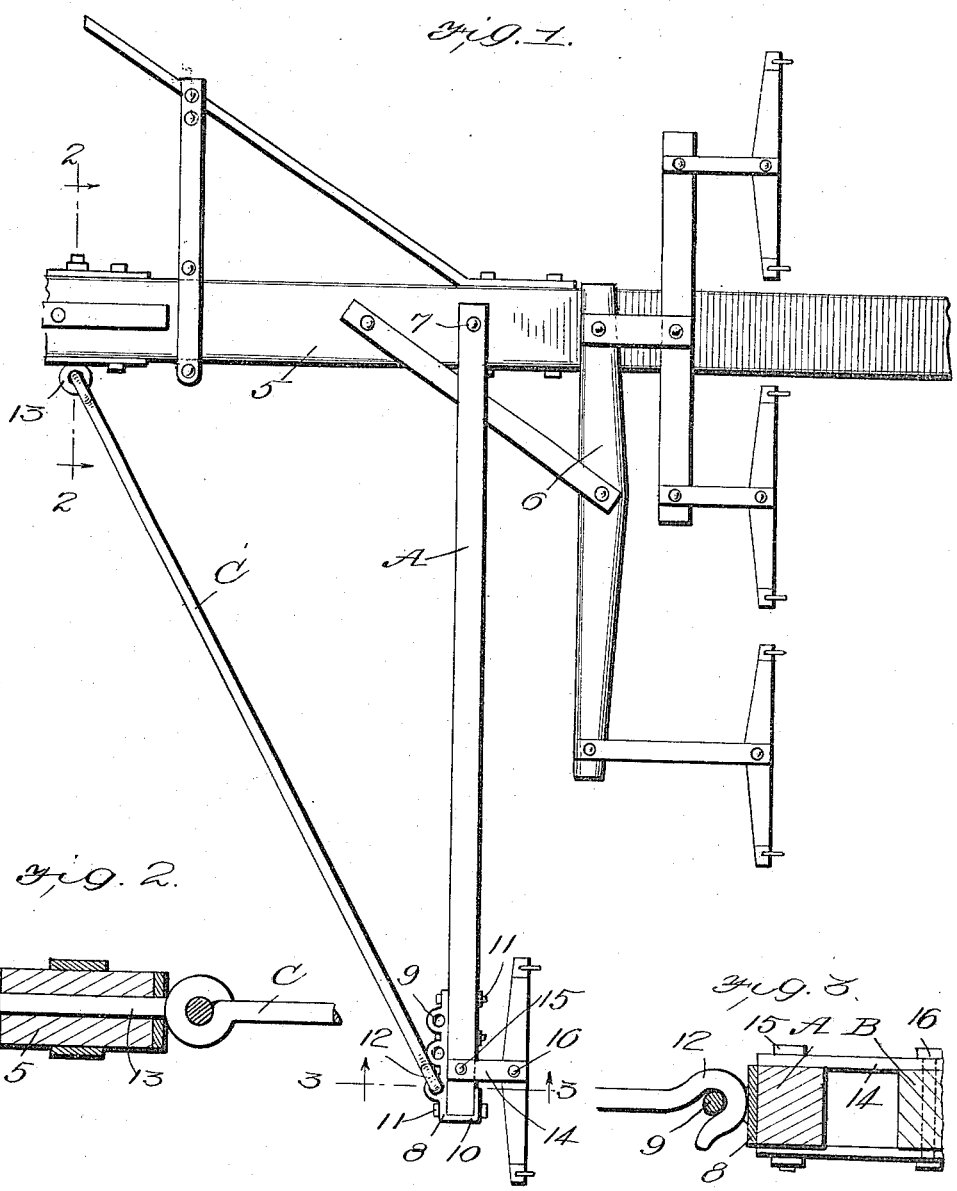

JACOB M. MILLER, OF MILLERSBURG, OHIO.

DRAFT APPLIANCE.

1,224,772. Specification of Letters Patent. Patented May 1, 1917.

Application filed January 21, 1916. Serial No. 73,327.

*To all whom it may concern:*

Be it known that I, JACOB M. MILLER, a citizen of the United States, and a resident of Millersburg, in the county of Holmes and State of Ohio, have invented a certain new and useful Improvement in Draft Appliances, of which the following is a specification.

One of the principal objects of my invention is to provide an improved draft appliance in the nature of a hitch for a single horse, and which may be used in conjunction with a multiple horse draft device such as a two- or three-horse double-tree, the device presenting advantages in simplicity, convenience of arrangement, and advantages of reversibility whereby it may be applied either to the right or left hand side of the vehicle tongue.

A further object of the invention is to provide a draft appliance of the nature set out, which will be extremely simple, durable, efficient in operation, and inexpensive to manufacture.

With these and other objects in view which will become apparent as the description proceeds, the invention resides in the construction, combination, and arrangement of parts hereinafter more fully described and claimed, and illustrated in the accompanying drawing in which like characters of reference indicate like parts throughout the several figures, of which—

Figure 1 represents a top plan view of an appliance constructed according to my invention showing the same in operation.

Fig. 2 represents a view in section taken vertically and transversely on the plane indicated by the line 2—2 of Fig. 1.

Fig. 3 represents a view in section taken vertically and longitudinally on the plane indicated by the line 3—3 of Fig. 1.

Referring more particularly to the drawing, the tongue of a vehicle, such as a binder or cultivator, is indicated at 5, and connected therewith as indicated at 6, is a multiple horse draft device, indicated in the drawing as being a three-horse double-tree.

The device forming the subject of my invention includes an arm A connected at its inner end by means of a bolt or other suitable device 7, with the tongue 5 of the vehicle. The arm A is arranged preferably at the rear of the draft device 6. The outer end of the arm is equipped with a metallic plate 8 having a plurality of eyes 9 formed therein, and having one end bent over in the shape of a hook 10 which engages around the outer end of arm A. Suitable fastening means such as bolts 11 are used for maintaining the plate in place upon the arm. A rod or brace C is provided with an eye or hook 12 at its forward end which may be engaged in any of the eyes 9. The rear end of the brace or rod is secured by means of an eye bolt or other suitable device 13 with the tongue 5 of the vehicle near the rear end of the latter. A swingletree B is connected by means of plates or links 14 with the arm A near the outer end of the latter. These links at their rear ends overlap the arm on opposite sides of the latter, and are pivotally connected thereto as at 15. The swingletree B is pivoted between the forward ends of the links at 16.

The hitch or draft appliance thus provided, may be used in conjunction with a multiple horse draft device whereby to equalize the draft upon the vehicle tongue and confine the latter to impart a straight pull to the vehicle. The device is extremely simple in construction, and may be readily secured in place on a vehicle, and can be so placed as to extend either to the right hand or to the left hand side of the tongue, depending upon the construction and arrangement of the draft device with which it is used.

Although I have described the preferred embodiment of my invention, I may desire to make such changes in the construction, combination, and arrangement of parts thereof, as do not depart from the spirit of the invention, and the scope of the appended claim.

I claim:—

The combination with a vehicle, of a multiple horse draft element arranged at one side of the tongue of the vehicle and connected thereto, an arm arranged on the same side of the tongue as the said draft element, said arm being connected with the tongue, a rod adjustably connected at one end to the arm and connected at its other end to the tongue rearwardly of the arm, a swingletree, and links connecting the swingletree to the arm.

JACOB M. MILLER.

Witnesses:
  CARL SCHULER,
  THEO. BELL.

Copies of this patent may be obtained for five cents each, by addressing the "Commissioner of Patents. Washington, D. C."